Jan. 22, 1957 F. JOB ET AL 2,778,954

REMOTE POWER SUPPLY SYSTEM FOR AMPLIFIER STATIONS IN TELECOMMUNICATION CABLES

Filed Oct. 15, 1954 4 Sheets-Sheet 4

United States Patent Office 2,778,954 Patented Jan. 22, 1957

2,778,954

REMOTE POWER SUPPLY SYSTEM FOR AMPLIFIER STATIONS IN TELECOMMUNICATION CABLES

François Job, Paris, and Pierre Jean-Marie Clavier, Nogent-sur-Marne, France

Application October 15, 1954, Serial No. 462,491

Claims priority, application France October 17, 1953

7 Claims. (Cl. 307—64)

The present invention relates to a remote power supply system for repeaters and, more generally line equipments located in intermediate stations spaced along a telecommunication cable and comprising no individual sources of energy, from a main station provided with a source of energy.

In certain known remote power supply systems known at present, a power supply current, direct or, more often, alternating current is superposed, in all or part of the conductors in the telecommunication cable, on the telephone signals and is used for the power supply to repeaters inserted in series on this cable at each amplifier station. Briefly, all repeaters in the various stations assigned to one communication circuit are power supplied in series by a power supply current flowing through this circuit. As will be explained in detail hereinafter, such a power supply system allows the remote supply of only a small number of amplifier stations, a number which is determined by the maximum voltage to which the cable circuits can be subjected.

An object of the present invention is to increase, with respect to known systems, the number of stations which it is possible to power supply from a distance in a given cable and with a given power supply voltage, or to power supply from a distance the same number of stations with a lower voltage.

Another object of the invention is, when the number of stations to be power supplied from a distance does not exceed the number of available conductor pairs in the telephone cable, to make the power supply circuits for the various stations independent of one another.

Each of said circuits consists of a number of parallely connected cable conductor pairs the number of such pairs in any individual circuit being the higher the more distant is the station fed through said individual circuit. Otherwise stated, the number of conductor pairs varies in proportion to the distance of a station from the main station. In the amplification section immediately preceding the latter said station, an extra number of conductor pairs are preferably parallelly connected with said circuit; this extra number of pairs is readily found in the conductors extending in the cable beyond the preceding station and which are available since the power supply circuit of said preceding station has already been completed before matching the said section immediately preceding the considered station.

The various power circuits may be obtained by constituting for each station a distinct remote power supply circuit by connecting, end to end, elemental circuits the length of which is equal to one cable amplification section (we understand by "cable amplification section" the cable length located between two consecutive stations), made up either of the side circuit of a balanced pair, i. e. by the two conductors of this pair used, one as a forward conductor, the other one as a return conductor, or of the phantom circuit of a quad formed by the conductors of each pair in the quad taken in parallel, or by the superphantom circuit of two quads formed by the four conductors of two quads taken in parallel, or more generally of a number of first conductors of symmetrical pairs taken in parallel and of the same number of second conductors of these same pairs taken in parallel. In the constitution of these remote power supply circuits, the following conditions are taken into account:

All the conductors comprising the cable should be utilized;

The resistances of the various remote power supply circuits are made as close to one another as possible.

When the cable is made up of coaxial lines, the elemental circuits may be formed either by the inner conductor and outer conductor of a coaxial line, or by the inner and outer conductors of a first coaxial line taken in parallel and the inner and outer conductors of a second coaxial line taken in parallel, or, more generally, by the inner and outer conductors of a number of coaxial lines taken in parallel, and by the inner and outer conductors of an identical number of coaxial lines taken in parallel, or, if preferred, by all the inner conductors of a number of coaxial lines taken in parallel and all the outer conductors of these same lines taken in parallel.

The invention will be better understood from the detailed description now about to be given, and with reference to the appended drawings in which.

When, in a known manner, the repeaters, or more generally the equipments of several stations are to be power supplied from a distance, from the same terminal station, a diagram of the so called "series" type is ordinarily used, in which all the equipments arranged in series on one circuit are power supplied through this circuit. In other words, a given circuit power supplies in each station a single repeater which is the one used for amplifying the signals it transmits.

Figure 1:
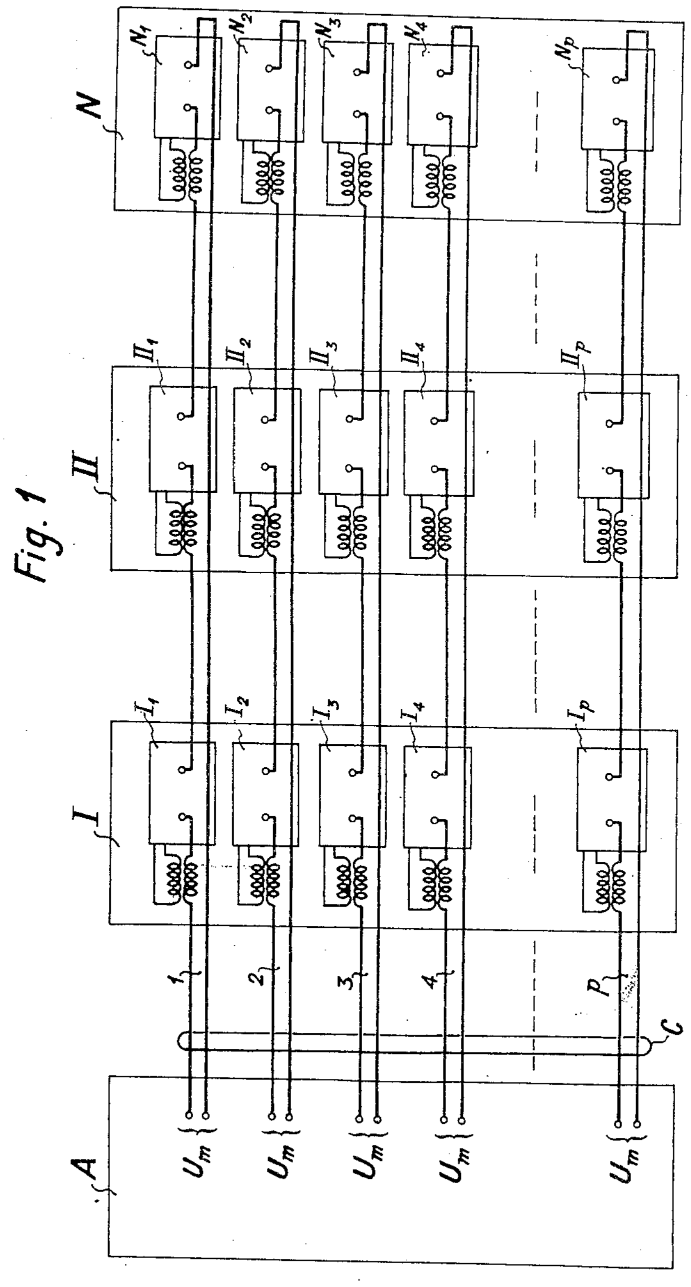
Figure 1 represents a remote power supply system of a known type wherein all the repeaters assigned to one circuit are power supplied in series through said circuit.

In Figure 1, C designates a cable comprising $p$ pairs of conductors, A is a station, including a source of energy and I, II, . . . N are stations to be power supplied from a distance. $I_1$, $II_1$, . . . $N_1$ designate respectively the repeater equipments for circuit I, $I_2$, $II_2$, . . . $N_2$ those of circuit 2, $I_p$, $II_p$, . . . $N_p$ those of circuit $p$. If R designates the resistance of one of the circuits 1 to $p$, and Z the common impedance of the repeater equipments, assumed to be identical, the power supply voltage which must be applied, at station A, to each one of the circuits is:

$$U=ni(R+Z)$$

in which $n$ is the number of sections in each circuit, equal to the number of stations and $i$ the power supply current.

Designating by $W=Zi^2$ the constant power to be supplied to each repeater, the voltage U is represented by the expression:

$$U=n(R+Z)\sqrt{\frac{W}{Z}} \quad (1)$$

and it will be minimum when $$\frac{\partial}{\partial Z}\left|n(R+Z)\sqrt{\frac{W}{Z}}\right|=0$$

i. e. when $$R=Z$$

The minimum power supply voltage is then $$U_m=2n\sqrt{RW} \qquad (2)$$

The voltage $U_m$ is thus uniquely determined by the resistance of the cable circuits and the power W. The number of stations $n$ which it is possible to power supply is determined by the maximum voltage compatible with the dielectric strength of the circuit below which $U_m$ should remain.

Figure 2:
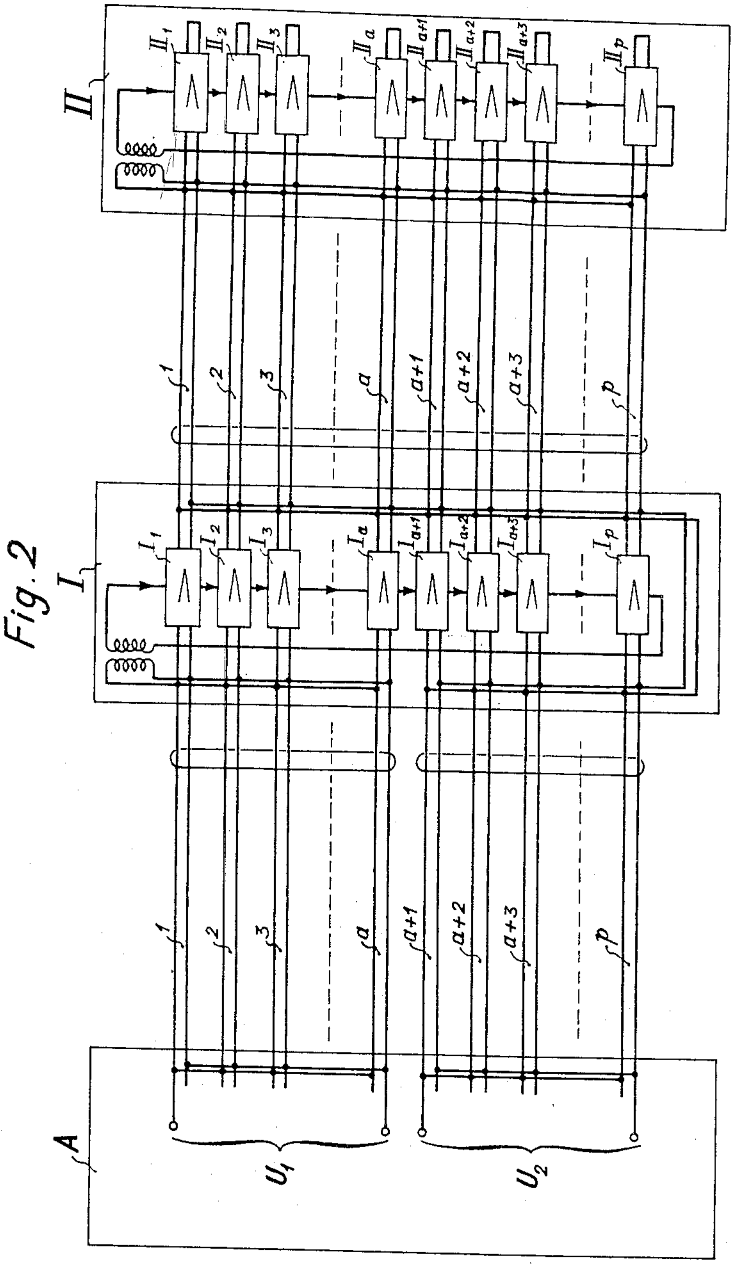
Figure 2 represents the remote power supply system of the invention for the case of two stations and a cable comprising $p$ pairs of conductors.

Referring now to Figure 2 which represents a remote power supply system according to the invention, and in which it has been assumed that the number of stations to be power supplied is $n=2$, station I is power supplied by $a$ circuits in parallel over the first section, while station II is power supplied by $(p-a)$ circuits in parallel over the first section and $p$ circuits in parallel over the second section.

When, in the present specification, we speak of arranging circuits in parallel, it should be understood that this placing in parallel is effected only for the power supply currents and not for telephone currents. To this effect, there are provided, at the points of separation of the power supply currents and telephone currents and at mixing points for these same currents, a low pass filter on each circuit on which a power supply current should be propagated alone and a high pass filter on each circuit on which a telephone current should alone be propagated. In order not to overload all these figures, these filters were represented only in Figure 3.

The power necessary for the power supply to the $p$ repeaters in each one of the stations I and II is $p$W. On the other hand the resistance of the power supply circuit, comprising $a$ circuits in parallel and having a length equal to one section which supplies the first station is $$\frac{R}{a}$$

and the resistance of the power supply circuit $p$, comprising $p-a$ circuits in parallel having a length equal to one section and $p$ circuits in parallel also having a length equal to one section, which supplies the second station is $$\frac{R}{p-a}+\frac{R}{p}$$

As a result, the power supply voltages of the circuits supplying the stations I and II are respectively, taking into account the fact that the circuits $\alpha$ and $\beta$ should supply to each station a power $p$W:

$$U_1=2\sqrt{\frac{R}{a}pW}=2\sqrt{\frac{p}{a}}\sqrt{RW}$$

$$U_2=2\sqrt{\left(\frac{R}{p-a}+\frac{R}{p}\right)pW}=2\sqrt{\frac{2p-a}{p-a}}\sqrt{RW}$$

The two voltages $U_1$ and $U_2$ will be equal if:

$$\frac{p}{a}=\frac{2p-a}{p-a}$$

i. e., $$\frac{a}{p}=\frac{3-\sqrt{5}}{2}=0.382 \qquad (3)$$

whence:

$$U_1-U_2=3.236\sqrt{RW}$$

These voltages, therefore, are less than the voltage $U_m$ of the power supply according to the system of Figure 1 which, in the case of $n=2$ is equal to $4\sqrt{RW}$.

If the number of circuits $p$ is not large, it is difficult to obtain a ratio $a/p$ close to 0.382. Indeed, $a$ and $p$ being integers, it is possible to obtain, for the ratio $a/p$ only the values $$\frac{1}{p}, \frac{2}{p}, \frac{3}{p} \cdots 1$$

Figure 3:
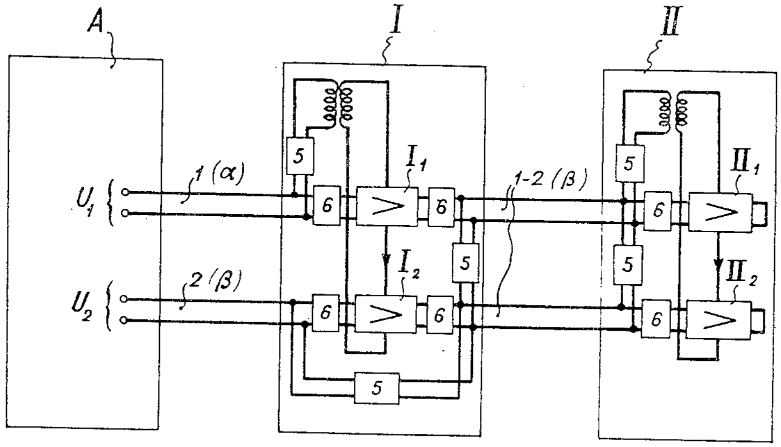
Figure 3 represents the same system for the case of two stations and a cable comprising two pairs of conductors.

In the case of two circuits, 1 and 2, for instance, Fig. 3, the first circuit $\alpha$ will be constituted by the first section of circuit 1 and the circuit $\beta$ by the first section of circuit 2 extended by the second sections of circuits 1 and 2 in parallel. We then have $$p=2$$

$$a=1$$

$$\frac{p}{a}=2$$

$$\frac{2p-a}{p-a}=3$$

hence $$U_1=2\sqrt{2}\sqrt{RW}=2.83\sqrt{RW}$$
$$U_2=2\sqrt{3}\sqrt{RW}=3.46\sqrt{RW} \qquad (4)$$

instead of $4\sqrt{RW}$ with the conventional system. The voltages $U_1$ and $U_2$ are then different, since $a/p$ does not have the value derived from Equation 3, but the larger one, $U_2$ is still less lower by 15% than the value $4\sqrt{RW}$.

In Figure 3, 5 represents the low pass filters and 6 the high pass filters mentioned above.

Figure 4:
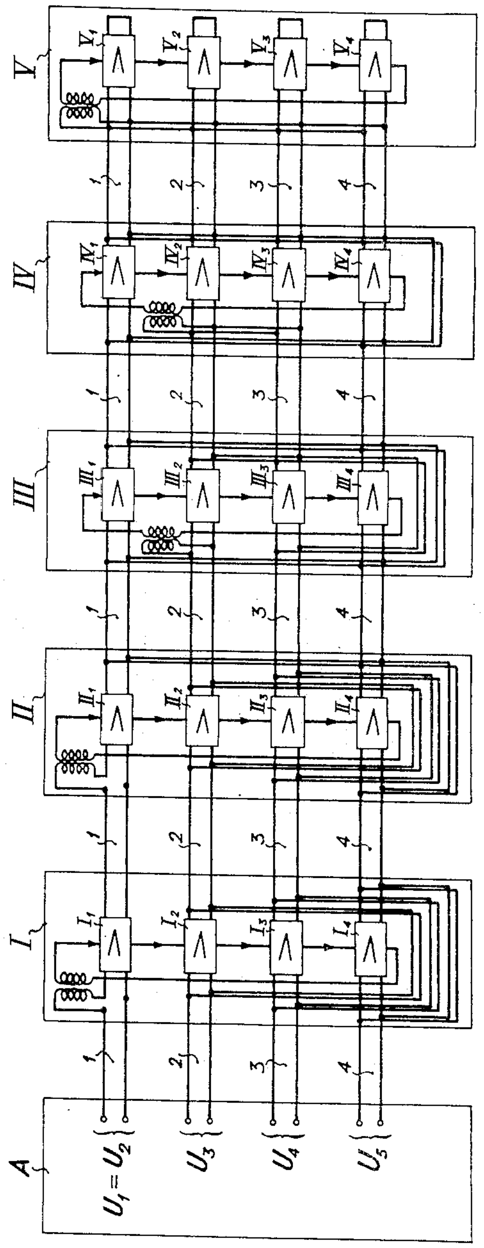
Figure 4 represents the same system for the case of five stations and a cable comprising four pairs of conductors.

In another example of embodiment of the invention, referring to Fig. 4, five stations are to be power-supplied, designated by the reference numerals I, II, III, IV, V and four circuits designated by the reference numerals 1, 2, 3, 4. The power to be supplied to each station is 4W.

The stations I and II are power supplied in series through circuit 1. The power supply voltage is:

$$U_1=U_2=2\times2\sqrt{4RW}=8\sqrt{RW}$$

(application of Formula 1 to the case in which $n=2$). It may be said also that circuit 1, with a resistance 2R supplies two stations with a total power 8W.

Station III is power supplied by the three first sections of circuit 2, with a resistance 3R. The power supply voltage is:

$$U_3=2\sqrt{4W\times3R}=4\sqrt{3}\sqrt{RW}=6.92\sqrt{RW}$$

The station IV is power supplied by the three first sections of circuit 3 and the fourth sections of circuits 2 and 3 in parallel. The resistance of the whole is $$U_4=2\sqrt{4W\times3.5R}=4\sqrt{3.5}\sqrt{RW}=7.49\sqrt{RW}$$

Station V is power supplied by the two first sections of circuit 4, the third and fourth sections of circuits 1 and 4 in parallel and the fifth sections of circuits 1, 2, 3 and 4 in parallel. The resistance of the whole is 3.25R. The power supply voltage is:

$$U_5=2\sqrt{4W\times3.25R}=4\sqrt{3.25}\sqrt{RW}=7.22\sqrt{RW}$$

With the conventional power supply method, the power supply voltage to be applied to each circuit supplying one repeater in each station would have been $10\sqrt{RW}$ (application of Formula 1 to the case of $n=5$). The highest power supply voltage $U_1$ is lower by 20% than this latter voltage.

These different results assume that the impedances of the repeaters or more generally of the remote power supplied equipments have been so calculated as to make the power supply voltage a minimum in each case, i. e. the load impedance in the station should be equal to the impedance of the circuit which power supplies it.

Now it may be considered inconvenient for service, to have different load impedances in each station. Equal impedances make it possible to have equal currents in all stations.

It may be noted that the values of the power supply voltages determined above are minimum with respect to the load impedance and that, consequently, a variation of the first order of the latter will cause only a variation of the second order on the power supply voltage.

Taking the example of Figure 3, the resistances of the power supply circuits $\alpha$ and $\beta$ are respectively R and 1.5R, the load impedance should be:

$$Z_1=R \text{ at station I}$$

and $$Z_2=1.5R \text{ at station II}$$

and the power supply currents are then:

$$i_1=\sqrt{\frac{W}{2R}}$$

$$i_2=\sqrt{\frac{2W}{1.5R}}$$

If we now assume, as an impedance for the load at station I $$Z_{1'}=1.5R$$

the power supply currents become both equal to:

$$i_1'=i_2=\sqrt{\frac{2W}{1.5R}}$$

and the power supply voltage for station I becomes:

$$U_1'=(R+1.5R)\sqrt{\frac{2W}{1.5R}}=2.88\sqrt{RW}$$

(application of Formula 1 with $n=1$) which differs from $U_1$ as given by Formula 4 by less than 2% only.

Taking now the example of Figure 4, the resistances of the power supply circuits in stations I to V are respectively R, 3R, 3.5R and 3.25R (R being the resistance per section as regards the power supply circuit for stations I and II); the load impedances should be:

$$Z_1=Z_2=R$$
$$Z_3=3R$$
$$Z_4=3.5R$$
$$Z_5=3.25R$$

and the power supply currents are then:

$$i_1=i_2=\sqrt{\frac{4W}{R}}$$

$$i_3=\sqrt{\frac{4W}{3R}}$$

$$i_4=\sqrt{\frac{4W}{3.5R}}$$

$$i_5=\sqrt{\frac{4W}{3.25R}}$$

If we now take as a mean load impedance for the five stations I to V:

$$z=1.5R$$

The power supply currents all become equal to $$j=\sqrt{\frac{4W}{1.5R}}$$

and the power supply voltages become respectively:

$$U_1'=U_2'=2(R+1.5R)\sqrt{\frac{4W}{1.5R}}=8.16\sqrt{RW}$$

$$U_3'=(3R+1.5R)\sqrt{\frac{4W}{1.5R}}=7.34\sqrt{RW}$$

$$U_4'=(3.5R+1.5R)\sqrt{\frac{4W}{1.5R}}=8.16\sqrt{RW}$$

$$U_5'=3.25R+1.5R)\sqrt{\frac{4W}{1.5R}}=7.78R$$

which differ but little, respectively, from the voltages $U_1$ to $U_5$ and are alway definitely lower than the value $10\sqrt{RW}$ given by the conventional method.

The choice of the common value $z$ will be made by means of the following considerations:

If the load impedance of a station, $z$, is equal to the resistance $r$ of the power supply circuit for that station, the power supply voltage is, from Formula 2:

$$u_m=2\sqrt{rw}$$

where $w$ is the total power to be delivered at the station.

If, on the other hand, the value of $z$ differs from $r$ by a relative amount $$x=\frac{r-z}{r}$$

the power supply voltage is, from Formula 1

$$u=(r+z)\sqrt{\frac{W}{z}}=(2-x)\sqrt{\frac{wr}{(1-x)}}$$

the ratio $u/u_m$ is equal to $$\frac{u}{u_m}=\frac{2-x}{2\sqrt{1-x}}$$

Figure 5:
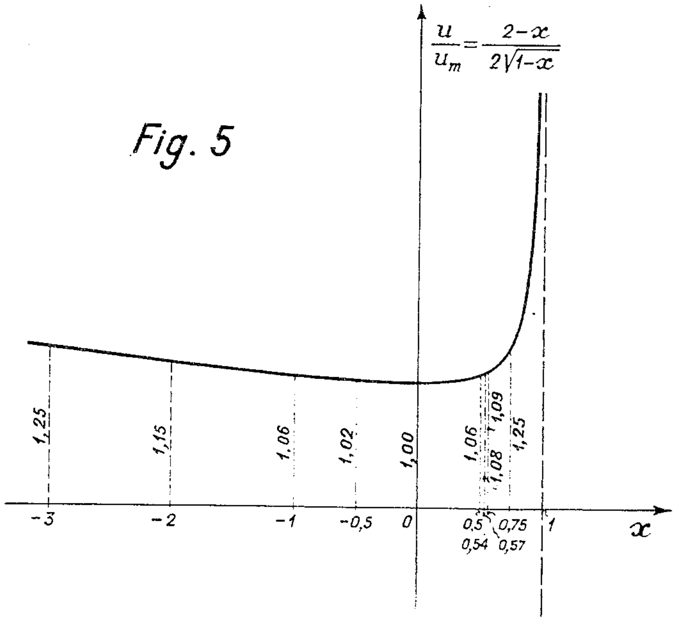
Figure 5 is a curve for explaining how the impedances of the equipments for remote power supply in the various stations may be made equal.

A curve giving the value of this ratio as a function of $x$ is represented in Figure 5. It makes is possible, for a load impedance which is common and chosen equal, for instance, to the arithmetical mean of the resistances of the power supply circuits for the various stations, to know the variation in percent of the power supply voltages with respect to the case in which, in each station, the load impedance would be equal to the resistance of the power supply circuit for that station.

One may set a condition for the common load impedance, as, for instance, to make equal the power supply voltages for two given stations, stations I and IV, for instance, in the case of Figure 4. In such a case:

$$U_1'=2(R+z)\sqrt{\frac{4W}{z}}$$

$$U_4'=(3.5R+z)\sqrt{\frac{4W}{z}}$$

The condition $U_{1'}=U_{4'}$ requires:

$$z=1.5R$$

and it is found, from the curve in Figure 5 that:

to $$x_1=\frac{R-1.5R}{R}=-50\%$$

there corresponds a variation of 2% for $U_1$, i. e. $U_{1'}=1.02U=8.16\sqrt{RW}$ $$x_3=\frac{3R-1.5R}{3R}=50\%$$

there corresponds a variation of 6% for $U_{3'}$, i. e.

$$U_{3'}=U_3\times1.06=7.34\sqrt{RW}$$

to $$x_4=\frac{3.5R-1.5R}{3.5R}=57\%$$

there corresponds a variation of 9% for $U_4$, i. e.

$$U_{4'}=U_4\times1.09=8.16\sqrt{RW}$$

to $$x_5=\frac{3.25R-1.5R}{3.25R}=54\%$$

there corresponds a variation of 8% for $U_5$, i. e.

$$U_{5'}=U_5\times1.08=7.78\sqrt{RW}$$

What we claim is:

1. A power supply system utilizing a cable comprising a main station, a power source thereof coupled to said cable, a plurality of conductor pairs in said cable, a number of spaced amplifier stations positioned along said cable, and an equal number of power supply circuits for said amplifier stations, each of said power supply circuits respectively coupling one of said amplifier stations to said power source, each of said power supply circuits consisting of a number of said conductor pairs in parallel connection, the number of said conductor pairs being proportional to the distance of the associated amplifier station from said main station, the conductors each being included in only one of said power supply circuits.

2. A power supply system for telecommunication equipment comprising a telephone cable, a main station, a power source thereof coupled to said telephone cable, a plurality of conductor pairs in said telephone cable, a number of spaced amplifier stations positioned along said cable, and an equal number of power supply circuits for said amplifier stations, each of said power supply circuits respectively coupling one of said amplifier stations to said power source, each of said power supply circuits consisting of a number of said conductor pairs in parallel connection, the number of said conductor pairs being proportional to the distance of the associated amplifier station from said main station, the conductors each being included in only one of said power supply circuits, each one of said power supply circuits being further comprised by an extra number of said conductor pairs in parallel connection in that portion nearest to the associated amplifier station and comprised between the associated amplifier station and the amplifier station next nearer said main station.

3. A power supply system as claimed in claim 2, more particularly adapted to the case where said telephone cable includes balanced telephone conductor pairs, wherein said each of said conductor pairs in said power supply circuits consist of the phantom pair of two of said telephone conductor pairs.

4. A power supply system as claimed in claim 2 wherein each of said amplifier stations is provided with a transformer matching the impedance presented to the associated power supply circuit to the resistance of said associated power supply circuit.

5. A power supply system as claimed in claim 2 wherein the extra number of conductor pairs in a power supply circuit coupled to one of said amplifier stations includes a number of pairs equal to the total number of pairs in the power supply circuits coupled to the all of the amplifier stations nearer to said main station than said one of the amplifier stations.

6. A power supply system as claimed in claim 5, more particularly adapted to an arrangement of amplifier stations regularly spaced along said telephone cable, wherein the respective numbers of conductors in the said power supply circuits are such that the individual resistances of said power supply circuits are substantially equal.

7. A power supply system as claimed in claim 5, applicable to the case where the number of said amplifier stations is equal to two, wherein the number of conductor pairs in the power supply circuit coupled to the amplifier station which is nearest said main station is substantially equal to 0.382 times the total number of conductor pairs in said telephone cable, and wherein the power supply circuit coupled to the most distant station comprises the remainder of the total number of conductor pairs for the part of its length extending from said main station to said nearest amplifier station and the total number of conductor pairs for the part of its length extending between said amplifier stations.

References Cited in the file of this patent

UNITED STATES PATENTS

| | | |
|---|---|---|
| 2,594,019 | Holman | Apr. 22, 1952 |
| 2,655,603 | Callahan et al. | Oct. 13, 1953 |